Patented Sept. 12, 1944

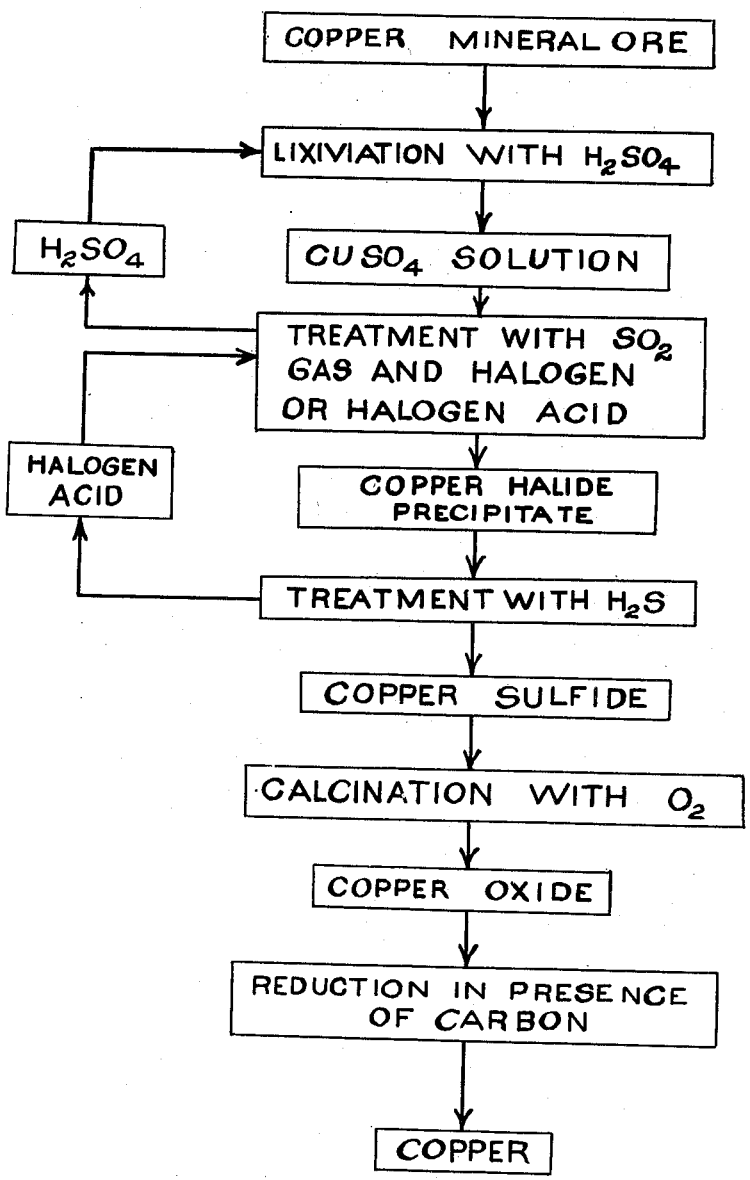

2,357,990

UNITED STATES PATENT OFFICE 2,357,990

PROCESS OF TREATING COPPER ORES

Arturo Amenabar, Santiago, Chile

Application February 27, 1941, Serial No. 380,944

7 Claims. (Cl. 23—135)

The present application contains subject matter which is related to that of my copending application Serial Number 204,884, filed April 28, 1938, now Patent No. 2,242,217.

The present invention relates to an industrial process for the lixiviation of copper ores and the subsequent recovery of copper. According to the present invention and constituting an essential feature thereof, the reagents which are necessary for treating the copper are regenerated and recycled through the process.

The present invention is a modification and improvement of the process disclosed in my U. S. Patent No. 1,343,153.

In the following description of the process wherever the term "iodine" or "iodide" is used it will be understood that bromine and chlorine or bromide and chloride, etc., may also be used.

The accompanying drawing is a diagrammatic representation in the form of a flowsheet of the cyclic embodiment of the process.

Referring now to the special manner of lixiviating the minerals of copper, which is an essential feature of my invention, I have discovered that if copper mineral ore, especially that of porphyritic composition is moistened with sulphuric, nitric and hydrochloric acid solutions, and is left without watering for 10 or 12 days, the water in the acid solution will have evaporated, and the sulphuric acid will have acted on the copper to form copper sulphate crystals within the rock, the crystals having a greater volume than the copper components of the ore so that the rock is broken along the fissures or veins of major mineralization.

Taking the above phenomenon as a basis, I have lixiviated the minerals in lumps without crushing, with good commercial results.

The uncrushed minerals may be placed in extensive fields, for example, in piles ten metres wide, 100 metres long, and 6 or 7 metres high on a slight incline in order that the lixiviation solutions may drain off into a collecting canal. These fields are covered with bituminous asphalt impervious to acids.

The lixiviating solution is applied to the ore in the form of a spray and in sections of say 10 metres at a time so that each section of the field gets sprayed every ten days. These intermittent sprayings permit the formation of crystals of copper sulphate within the mineral mass, which causes the disintegration of the mass without the necessity of using mechanical mills.

While the minerals are being treated in the above manner and when they contain copper sulfate, the spraying solutions should contain nitric, sulphuric and hydrochloric acid and also some copper and from 1% to 2% ferrous or ferric sulphate. The existence of copper in these solutions does not affect them as the process is a closed cycle.

As soon as the spraying with these super-oxidizing solutions begins, red nitrous vapors can be observed emanating from the piles of the mineral. At this moment the piles should be sprayed with a solution containing sulphuric acid and ferrous sulphate. The ferrous sulphate reacts with the nitrous vapors to form ferric sulphate, which serves to dissolve the calcosite and bornite of the minerals ($Cu_2S$ and $CuS$). The existence of sulphuric acid, air and copper sulphate causes a great amount of the nitrous gases to become nitric gases.

The copper bearing solutions of the lixiviating mixture are now treated with iodine in its elemental form or in the form of its acid HI together with sulphurous acid anhydride gases in order to precipitate copper.

The chemical reactions which take place are simultaneous; the hydriodic gas is in the presence of $SO_2$, the copper precipitates as copper iodide, while the $SO_2$ is turned into sulphuric acid at the same moment.

The chemical reactions which take place in this process can be expressed by the following equations:

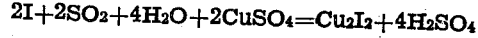

$$2I + 2SO_2 + 4H_2O + 2CuSO_4 = Cu_2I_2 + 4H_2SO_4$$

This new process of simultaneous operations has the advantage of making the sulphuric acid much more concentrated, since no reversible reaction exists between the sulphuric acid and the hydriodic acid for, as soon as the latter is formed, it is combined with the cupric solution in the presence of sulphurous acid anhydride, to produce cuprous iodide which is not affected by the concentrated and cold sulphuric acid, consequently, solutions of 15 to 20% sulphuric acid can easily be obtained.

In order to avoid the presence of iodine, in the solution of the resulting lixiviating acid, after precipitating the copper, I put less iodine in the reaction of precipitation than that which corresponds to the required theoretical amount so that the solution of lixiviating acid will contain from two to three tenths per cent of copper, because when there is copper in the solution it cannot in any case contain hydriodic acid or iodine.

The lixiviating solution of sulphuric acid which results from this reaction is utilized in treating new masses of copper mineral ore as explained hereinbefore.

The total amount of iodine used in the precipitation of the copper, including that which is in solution, is in the proportion of two parts of iodine to one of copper in solution (127 of iodine to 63½ of copper), and in the case of bromine, 1.259 of bromine to each one of copper in solution (79.92 of bromine to 63½ of copper, according to their atomic weights).

The precipitated product, cuprous iodide, is converted into copper sulfide by treating it while in suspension with hydrogen sulfide gas. To accomplish this the iodide precipitate is held in suspension in water either by means of agitators or by bubbling the hydrogen sulfide gas itself through the water under sufficient pressure to prevent the iodide from settling out. It is advantageous to circulate the suspended precipitate through a series of towers countercurrent to the hydrogen sulfide in order to obtain a complete reaction.

The products obtained are cuprous sulfide (approximately 79.5%) and HI in water solution according to the following equation:

$$Cu_2I_2 + H_2S + H_2O \rightarrow Cu_2S\downarrow + 2HI + H_2O$$

The halogen acid is used again for precipitating the copper, as copper halide, from the copper sulfate solution. The copper sulfide is washed and dried and then calcined whereby black cupric oxide and $SO_2$ is obtained. The latter may be used as the reducing agent in the selective precipitation of the copper by the halogen acids, or, if desired, it may be used to produce $H_2S$ by reducing it by means of incandescent coke in the presence of water vapor.

The copper oxide may be reduced to metallic copper in the form of powder by heating in the presence of carbon, such as anthracite and the like.

Having now particularly described the method of carrying out the present invention what I claim is:

1. The process of treating copper ore which comprises lixiviating such an ore with sulfuric acid, reacting the resulting copper sulfate with sulfur dioxide and a substance, selected from the group consisting of halogens and hydrogen halides in such manner as to produce sulfuric acid and a precipitate of a cuprous halide, reacting the latter in aqueous suspension with hydrogen sulfide so as to produce copper sulfide and hydrogen halide, recycling the latter to the copper sulfate treating step of the process and recycling the sulfuric acid to the first step of the process.

2. The process of claim 1 wherein iodine is employed in the copper sulfate treating step.

3. The process of claim 1 wherein hydriodic acid is employed in the copper sulfate treating step.

4. The process of claim 1 wherein said copper ore is lixiviated while in beds by spraying said beds with a sulfuric acid solution.

5. The process of claim 1 wherein said copper ore is lixiviated while in beds by spraying said beds with a solution containing nitric, sulfuric and hydrochloric acids and small amounts of copper and iron sulfate.

6. The process of claim 1 wherein said copper ore is lixiviated while in beds by spraying said beds with a solution containing sulfuric acid and ferrous sulfate.

7. A cyclic process of treating copper ores which comprises lixiviating such an ore with sulfuric acid, reacting the resulting copper sulfate with sulfur dioxide and hydriodic acid in such manner as to produce sulfuric acid and a precipitate of cuprous iodide, reacting the latter in the form of an aqueous suspension with hydrogen sulfide so as to produce copper sulfide and hydriodic acid, calcining the copper sulfide so as to produce copper oxide and sulfur dioxide, recycling the sulfuric acid to the first step of the process and recycling the hydriodic acid and the sulfur dioxide to the copper sulfate treating step of the process.

ARTURO AMENABAR.